United States Patent [19]

King et al.

[11] Patent Number: 4,554,824
[45] Date of Patent: Nov. 26, 1985

[54] AUTOMATED MANUAL TRANSMISSION SHIFTER WITH ELECTRONIC CONTROL ACTUATORS EXTERNAL OF THE VEHICLE

[75] Inventors: Francis G. King, Bloomfield Hills; Stewart V. Gable, Ypsilanti, both of Mich.

[73] Assignee: Ford Motor Company, Dearborn, Mich.

[21] Appl. No.: 682,524

[22] Filed: Dec. 17, 1984

[51] Int. Cl.[4] .......................................... G01M 15/00
[52] U.S. Cl. ........................................ 73/117; 73/132
[58] Field of Search ...................... 73/117, 116, 117.3, 73/132; 74/365, 473 R, 877

[56] References Cited

U.S. PATENT DOCUMENTS 2,281,159  4/1942  Kliesrath et al. .
3,465,577  9/1969  Donovan ............................. 73/116
3,713,332  1/1973  Herrbrich ........................... 73/117
4,393,695  7/1983  Marshall et al. .................. 73/117.3
4,466,279  8/1984  Gable et al. ........................ 73/117
4,495,801  1/1985  Sugimoto ............................ 73/117

Primary Examiner—Jerry W. Myracle
Attorney, Agent, or Firm—Peter Abolins; Robert D. Sanborn

[57] ABSTRACT

Transmission gear and clutch shifting apparatus for the automatic operation of manual shift mechanisms in an automotive vehicle include gear and clutch actuation mechanisms mounted onboard the vehicle and coupled by cables to control actuation mechanisms mounted offboard the vehicle. The onboard gear shift actuator includes two intersecting movable slot means for causing movement of the shift lever.

11 Claims, 5 Drawing Figures

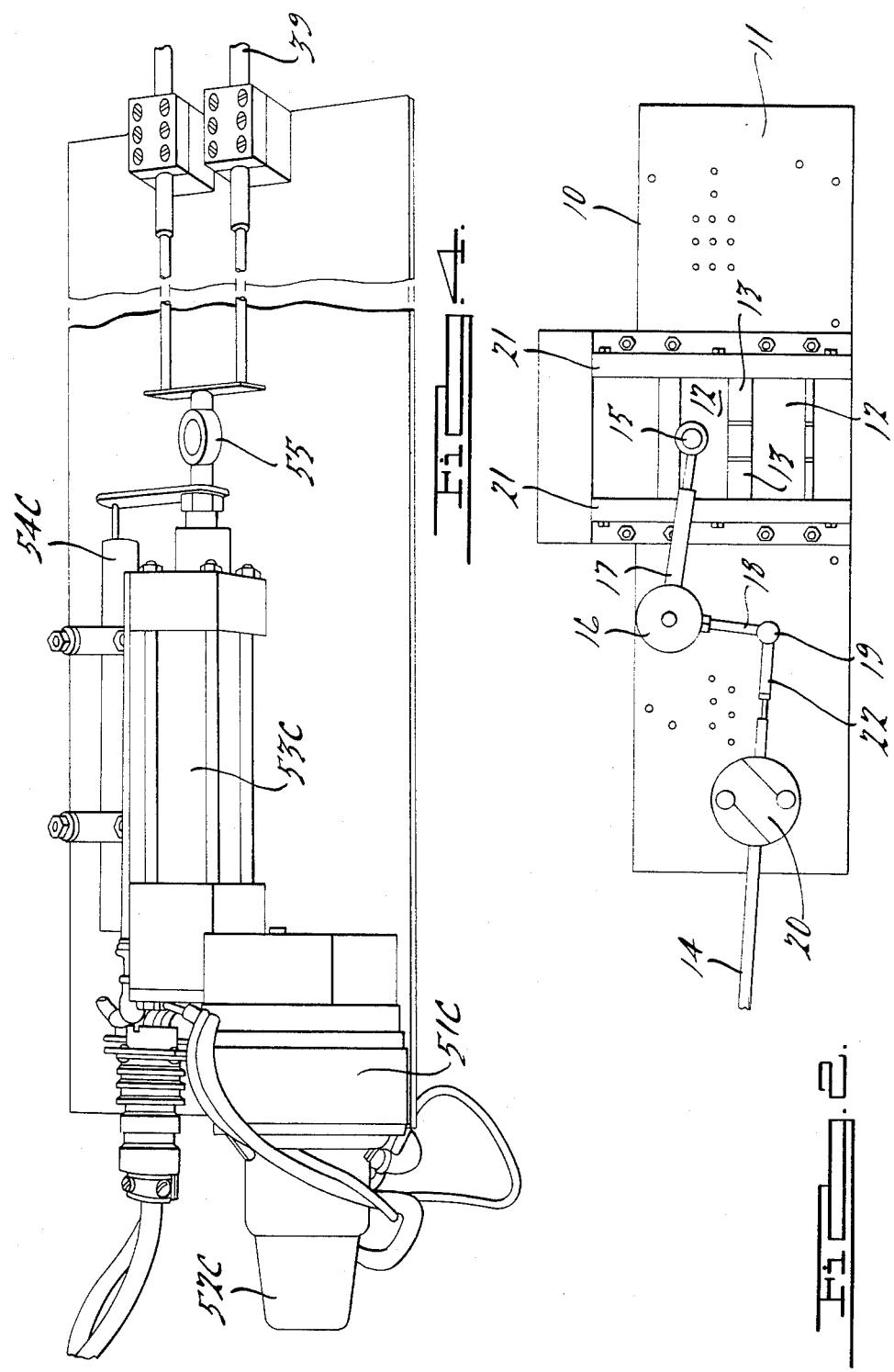

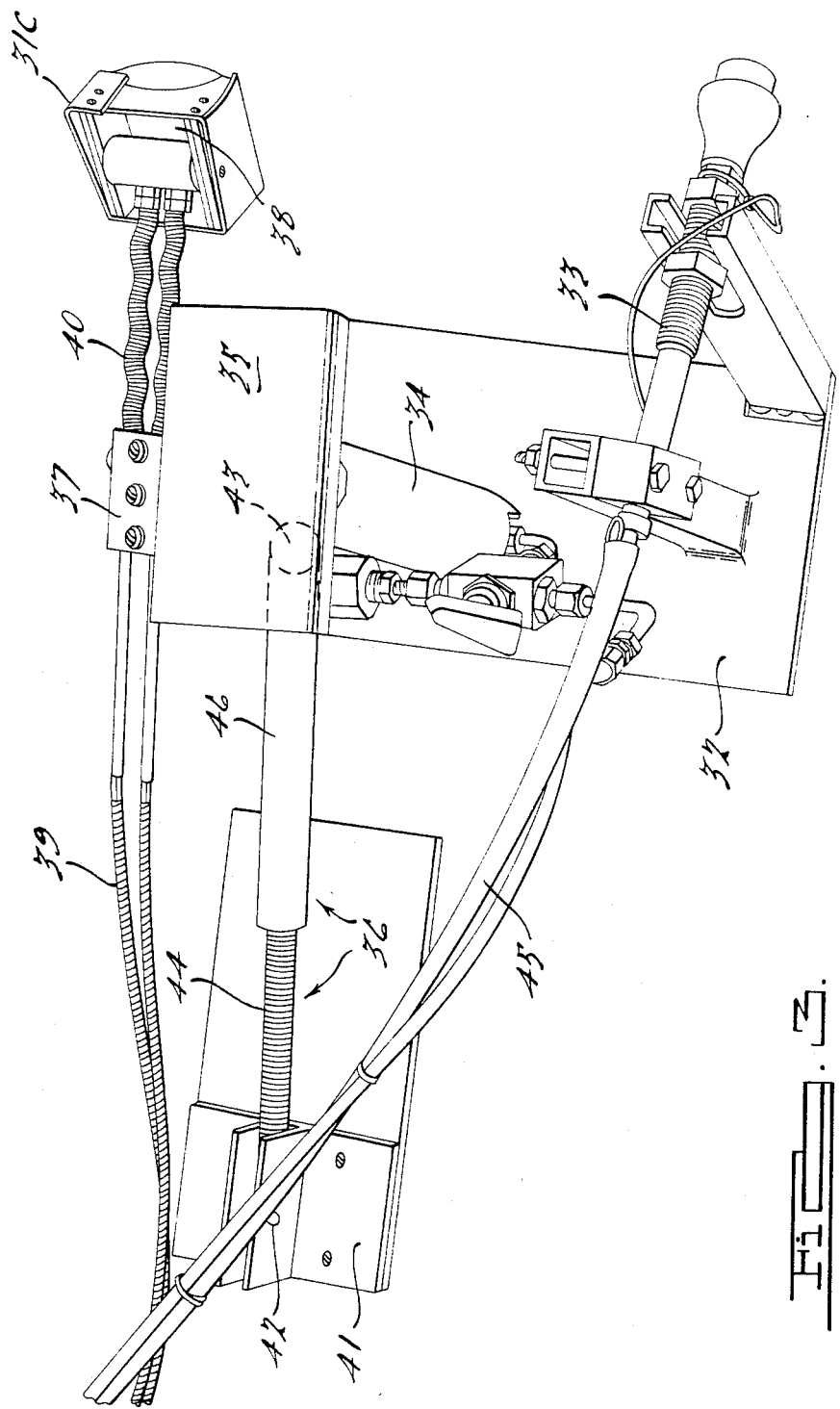

AUTOMATED MANUAL TRANSMISSION SHIFTER WITH ELECTRONIC CONTROL ACTUATORS EXTERNAL OF THE VEHICLE

BACKGROUND OF THE INVENTION

1. Technical Field

This invention relates to apparatus for manipulating the controls of an automobile.

2. Prior Art

U.S. Pat. No. 2,281,159 to Kliesrath et al discloses a transmission operating mechanism including a vacuum operated motor 20 connected to a lever 26. A vacuum operated motor for the gear shifter is mounted on the dash board while a vacuum operated motor for the clutch is mounted on the fire wall.

U.S. Pat. No. 3,713,332 to Herrbrich teaches an automatic manual transmission shifting mechanism including working cylinders 15 and 16 attached to gear shift lever 20 and a cylinder 14 attached to a clutch pedal 19. This system uses a double pneumatic cylinder system on a base frame, the installation of which requires the removal of the driver seat.

U.S. Pat. No. 4,393,695 issued to Marshall et al discloses an automatic manual shift system for use in testing a vehicle. A throttle servo 31, a clutch servo 32 and gear shifts servo 33 and 34 are connected to actuators for operating the throttle, clutch and gear shift, respectively. Servos 31-34 are located within the interior of the vehicle.

U.S. Pat. No. 3,465,577 issued to Donovan teaches an automatic manual transmission shifter including hydraulic cylinders 76 and 78 attached to column gear shift lever 26 and hydraulic cylinder 34 attached to clutch pedal 16. In this system, the hydraulic cylinders for column shifting are mounted on an external support which extends into the vehicle.

U.S. Pat. No. 4,466,279 issued to Gable et al teaches an automated driver system for a manual transmission vehicle including a gear shifting mechanism installed within the passenger compartment of a vehicle. The gear shifting mechanism includes a gear shift actuator with a DC motor, tachometer and lead screw assembly, a linear displacement transducer, a base mounting plate, a lazy-susan mounting mechanism for the gear shift actuator, a solenoid and a spring-loaded mounting bracket.

The uncovered prior art patents teach pneumatic, hydraulic or electric actuation systems which are installed within the vehicle. There still remains a need for improved installation. The installation apparatus itself should be relatively simple and capable of being installed in a relatively short time period. Easy and rapid installation is advantageous when it is necessary to move the mechanism for actuating the automotive controls from vehicle to vehicle for successive testing of the vehicles. These are some of the problems this invention overcomes.

SUMMARY OF THE INVENTION

This invention teaches a transmission gear and clutch shifting apparatus for the automatic operation of manual shift mechanism in an automotive vehicle. Electrical control and actuation mechanisms are mounted outside the vehicle. A relatively simple gear shift and clutch actuator means is mounted in the vehicle. Cables connect the interior-mounted actuator and the exterior-mounted actuator.

The gear shift mechanical actuator means, which is mounted in the vehicle, is coupled to the gear shift lever by a first cable coupling slot means having an elongated slot generally aligned with the transverse axis of the vehicle and a second coupling slot means having an elongated first slot generally aligned with the longitudinal axis of the vehicle for passing the gear shift lever. The first slot is coupled to a first flexible cable by a rotation means so that motion of the first flexible cable along the transverse axis of the vehicle causes motion of the first slot of the first coupling slot means along the longitudinal axis of the vehicle. The second slot is coupled to a second flexible cable for causing motion of the gear shift along the transverse axis of the vehicle.

The clutch mechanical actuation means, mounted in the vehicle and coupled to the clutch pedal, includes a third flexible cable for causing movement of the clutch.

Electronic actuators mounted outside the vehicle are coupled to the said flexible cables.

BRIEF DESCRIPTION OF THE DRAWINGS

FIG. 2 is a bottom plan view of a portion of gear shift actuator of FIG. 1;

FIG. 3 is a perspective view of an accelerator pedal and a clutch pedal actuator;

FIG. 4 is a perspective view of an off-board electronic clutch pedal actuator.

DETAILED DESCRIPTION OF THE INVENTION

Figure 1:
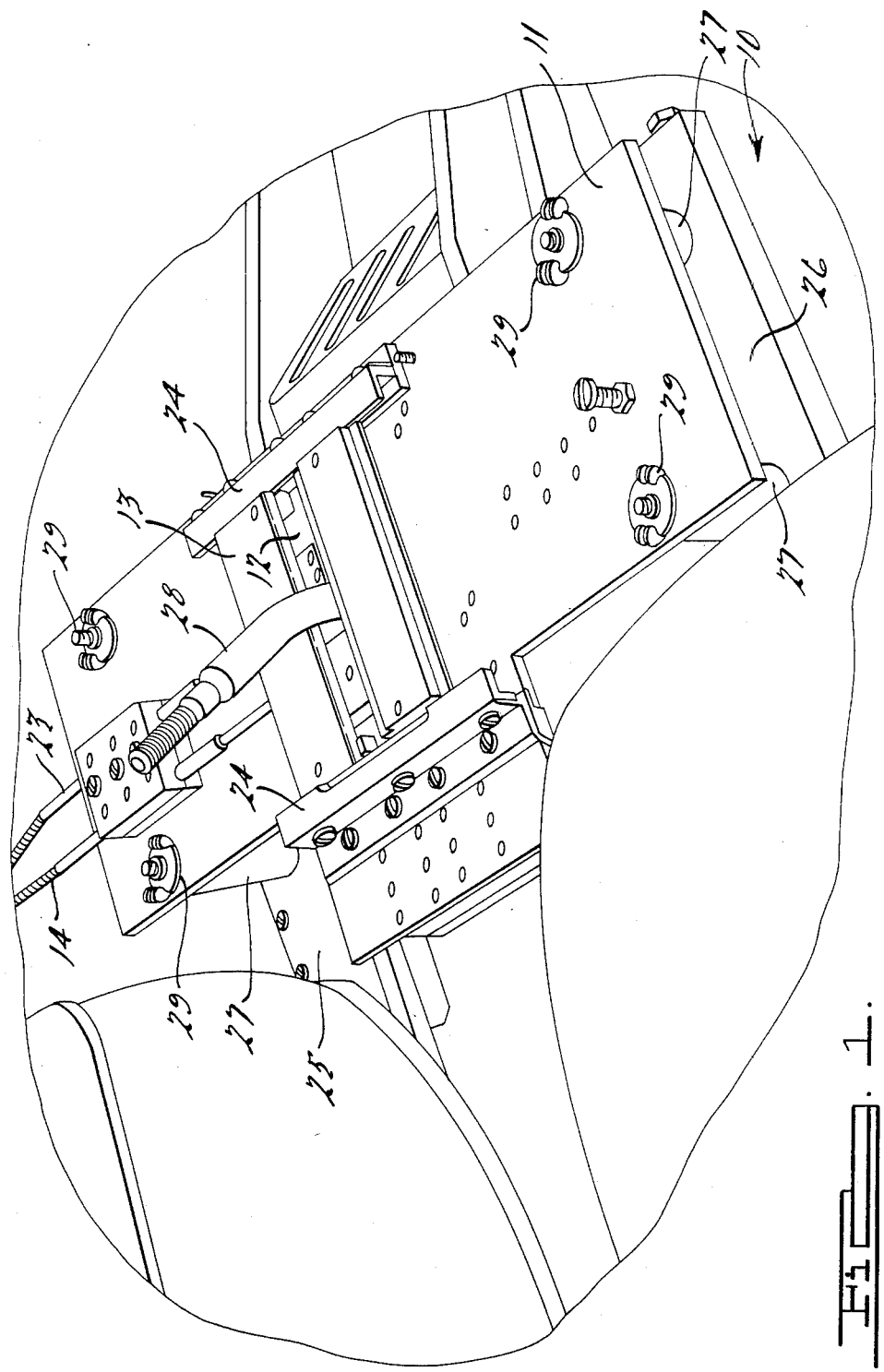
FIG. 1 is a perspective view of an installed gear shift actuator means coupled to a gear shift lever.

Referring to FIGS. 1 and 2, a gear shifting mechanism 10 includes a shifter plate 11 with longitudinal slide actuators 12 and transverse slide actuators 13. Slide actuators 12 and 13 each include a pair of removable plates which can be adjusted so that the intersection of the slots of slide actuators 12 and 13 can occur at a vehicle gear shift lever 28 and facilitate installation. Attachment between a cable 14 and slide actuators 12 includes a ball joint 15 coupled to slide actuators 12 by a bolt. Guide rails 21 support each side of slide actuators 12. A rotating disk 16 is coupled to ball joint 15 by a telescoping arm 17. A second arm 18, circumferentially displaced around rotating disk 16 from arm 17, is coupled between rotating disk 16 and a ball joint 19. Cable 14 is coupled to ball joint 19 by a threaded connection 22. Cable 14 is held to shifter plate 11 by a rotating clamp 20.

In operation, when the cable 14 is pushed forward, ball joint 19 displaces the position of lever arm 18 causing rotating disk 16 to turn. The turning of rotating disk 16 causes ball joint 19 to travel in an arc. Rotating clamp 20 permits corresponding movement of cable 14 and ball joint 19. As rotating disk 16 turns, telescoping arm 17 will rotate upwards pulling ball joint 15 and hence slide actuator 12 with it. Telescoping arm 17 will contract causing ball joint 15 to travel linearly parallel to guide rails 21. Hence, slide actuator 12 will not bind against guide rails 21 as it moves. The above-described actions are reversed when cable 14 is pulled backwards. The motion of slide actuator 13 is caused by the movement of the flexible cable 23 attached to slide actuator 13. Guide rails 24, supporting each side of slide actuator 13, allow the motion of the slide actuator 13 without any binding.

Shifter plate 11 rests on pillars 27 mounted to two sliding brackets 25, 26. Bracket 25 slides onto the seat track of the driver's seat. Bracket 26 slides onto the seat track of the passenger's seat. After sliding gear shift lever 28, without a shifter knob, through slide actuators 12 and 13, shifter plate 11 is fastened to pillars 27 with wing nuts 29.

Referring to FIG. 3, a clutch pedal mechanical actuator 31 is mounted on a base plate 32. Accelerator pedal actuator 33, an air cylinder 34 and a clamping plate 35 are mounted on base plate 32. A backward extending supporting arm 36 is fastened to base plate 32 by a ball joint 43.

Clutch pedal mechanical actuator 31 has an adjustable bracket 37 and a fitting 38 to fit it onto the vehicle clutch pedal. Fitting 38 is pivotal to allow mechanical actuator 31 to travel in a curvilinear path as it follows the path of the clutch pedal. Fitting 38 is connected to flexible cables 39. Springs 40 are fitted over cables 39 to enhance the extension of cables 39.

Upon positioning base plate 32 in the vehicle, supporting arm 36 is lifted upwards at ball joint 43. A support plate 41 is rotated around its ball joint 42 to push against the front side of the driver's seat Supporting arm 36 can be adjusted by rotating a sleeve 46 around a threaded arm 44. An air cylinder 34 can then be activated to push a clamping plate 35 against the bottom of the vehicle's instrument panel.

Flexible cables 14 and 23 from gear shifting mechanism 10, cables 39 from clutch pedal mechanical actuator 31 and a cable 45 from an accelerator pedal actuator 33 are coupled to relatively large electronic actuators which are external to the vehicle. Since the heavy and large electronic actuators are exterior to the vehicle, greater ease of installation of the actuators in the vehicle is realized. Each of the four electronic actuators (transverse shift, longitudinal shift, clutch, accelerator) consist of a dc motor 51 (A, B, C, D), a worm screw actuator 53 (A, B, C, D), a tachometer 52 (A, B, C, D) and a linear displacement transducer 54 (A, B, C, D), respectively, as shown in FIGS. 4 and 5.

Figure 5:
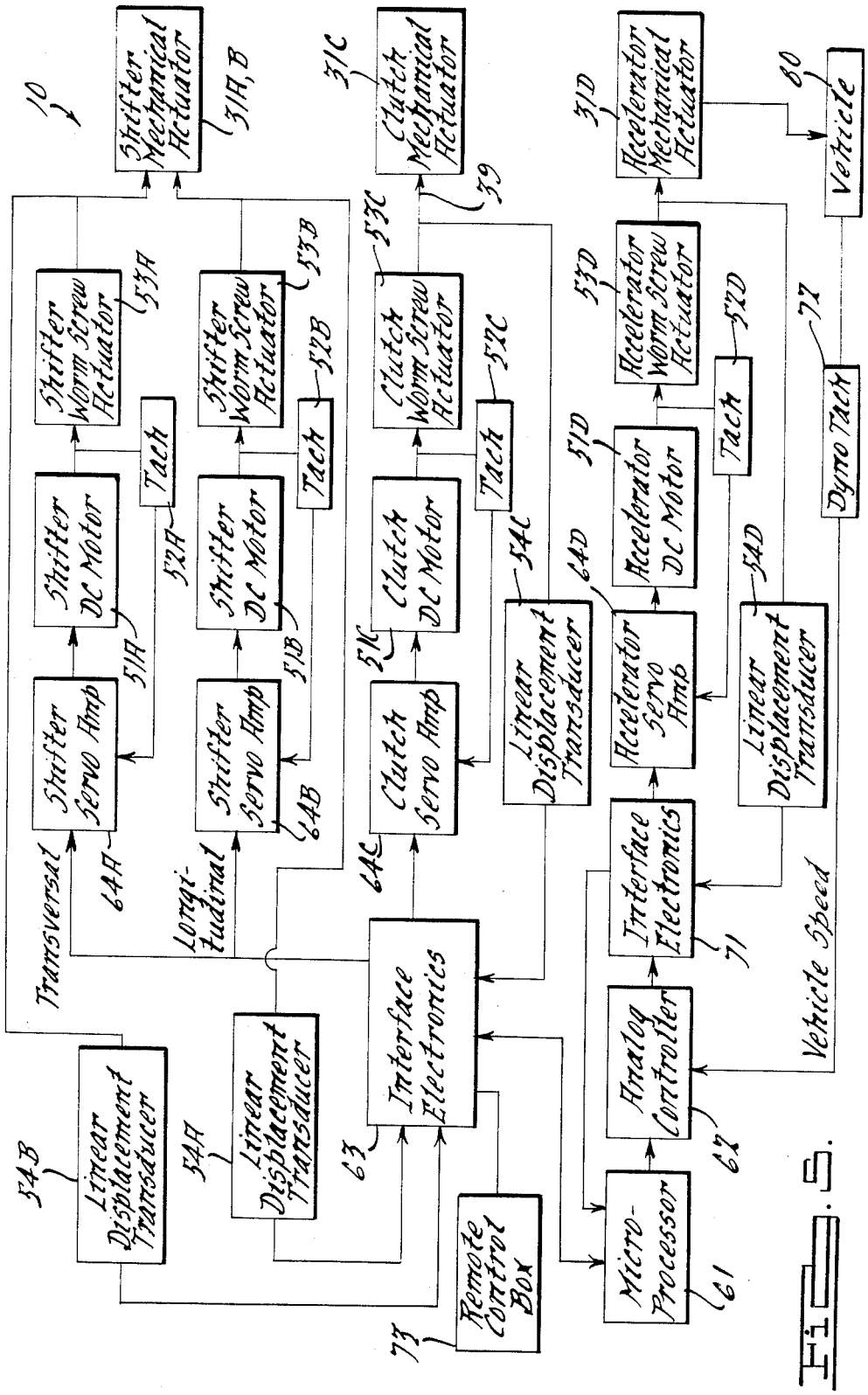
FIG. 5 is a block diagram of the operation of the gear shifting and clutch actuation means, in accordance with an embodiment of this invention.

Referring to FIG. 5, gearshifting mechanism 10 has a microprocessor 61 coupled through intermediate circuitry to a shifter mechanical actuator 31A, B; clutch mechanical actuator 31C; and accelerator mechanical actuator 31D. The coupling to accelerator mechanical actuator 31D includes the serial combination of an analog controller 62, interface electronics 71, accelerator servo amplifier 64D, accelerator dc motor 51D, and accelerator worm screw actuator 53D. Feedback couplings include a coupling from interface electronics 71 to microprocessor 61, a coupling from the output of accelerator dc motor 51D through a tachometer 52D to accelerator servo amplifier 64D, a coupling from the output of accelerator worm screw actuator 53D through a linear displacement transducer 54D to interface electronics 71, and a coupling from the output of the accelerator mechanical actuator 31D through a vehicle 80 and a dynamometer tachometer 72 to analog controller 62.

The coupling from microprocessor 61 to shifter mechanical actuator 31A, B and clutch mechanical actuator 31C is analogous to that of the coupling to accelerator mechanical actuator 31D. However, there are both transverse and longitudinal couplings to shifter mechanical actuator 31A, B. The coupling from microprocessor 61 to clutch mechanical actuator 31C includes a serial combination of interface electronics 63, clutch servo amplifier 64C, clutch dc motor 51C, and clutch worm screw actuator 53C. Feedback paths include a path from the output of clutch dc motor 51C through a tachometer 52C to clutch servo amplifier 64C, and a feedback path from the output of clutch worm screw actuator 53C through a linear displacement transducer 54C to interface electronics 63.

Coupling from microprocessor 61 to shifter mechanical actuator 31A, B includes the two serial paths through interface electronics 63, shifter servo amplifiers 64A, B; shifter dc motors 51A, B; shifter worm screw actuators 53A, B. Feedback paths include paths from the output of shifter motors 51A, B through tachometers 52A, B to the shifter servo amplifier 64A, B. Another feedback path is from the output of shifter worm screw actuators 53A, B through linear displacement transducers 54A, B to interface electronics 63. A remote control box 73 is coupled to interface electronics 63 to establish reference conditions for the position of the mechanical actuators.

In operation, system 10 is commanded by microprocessor 61 through interface electronics 63 and servo amplifier 64C. Servo amplifier 64C drives dc motor 51C. Worm screw actuator 53C converts dc motor 51C rotation to linear motion and transmits the motion to clutch mechanical actuator 31C through flexible cable 39. The speed of dc motor 51C is fed back to servo amplifier 64C through tachometer 52C. The position of worm crew actuator 53C is fed back to interface electronics 63 through linear displacement transducer 54C.

The operation of transverse and longitudinal gear shifter actuators 31A, 31B is identical to that of clutch pedal actuator 31C. For the accelerator pedal actuator, analog controller 62 is added between microprocessor 61 and interface electronics 71 to receive a third feedback loop supplying vehicle speed through dynamometer tachometer 72.

Remote control box 73 is coupled to interface electronics 63 providing the capability for the operator to set the initial position of the mechanical actuator means of the clutch, and the transversal and longitudinal shifter. The length of travel of each of those actuators can also be adjusted by the operator. Thus, once gear shifting mechanism 10 and clutch pedal mechanical actuator 31 are mounted in a vehicle, flexible cables 14, 23 and 39 are adjusted to establish reference points for system operation. Such reference points can be stored by microprocessor 61.

Microprocessor 61 also reads the position of the actuators through interface electronics 63 allowing the correct positioning of the actuators prior to the beginning of the test. During the test, microprocessor 61 reads the position of the shifter actuators to insure that the shift lever has been moved to the desired position. For the clutch actuator, the position is read to determine if the clutch engagement point has been reached. A strain sensor 55 (FIG. 4) is used to determine the clutch engagement point. Prior to the beginning of the test, microprocessor 61 commands the clutch actuator to move forward fully and retract slowly. Strain sensor 55 generates a signal indicating the strain at different positions of the clutch thus determining the clutch engagement point.

Various modifications and variations will no doubt occur to those skilled in the arts to which this invention pertains. For example, the particular bracing and support structure of the automatic driving system may be varied from that disclosed herein. Telescoping arm 15 can be replaced by the sliding coupling of a rod passing through a mounted sleeve. These and all other variations which basically rely on the teachings through which this disclosure has advanced the art are properly considered within the scope of this invention.

We claim:

1. A transmission gear and clutch shifting apparatus for the automatic operation of a manual gear shift mechanism in an automotive vehicle, the automotive vehicle having a gear shift lever with a plurality of manual shift positions, said gear and clutch shifting apparatus including:

a gear shift mechanical actuation means mounted in the vehicle and coupled to the gear shift lever having a first flexible cable for causing actuation of the gear shift lever along the longitudinal axis of the vehicle, and a second flexible cable for causing actuation of the gear shift lever along the transverse axis of the vehicle, said gear shift mechanical actuation means including a first coupling slot means having an elongated slot generally aligned with the transverse axis of the vehicle for passing the gear shift lever and being coupled to said first flexible cable by a rotation means so that motion of said first flexible cable along the transverse axis of the vehicle causes motion of the slot of said first coupling slot means along the longitudinal axis of the vehicle, said gear shift actuator further including a second coupling slot means having an elongated slot generally aligned with the longitudinal axis of the vehicle for passing the gear shift lever and being coupled to said second flexible cable for causing motion of the gear shift along the transverse axis of the vehicle;

a first cable electronic actuator means mounted outside the vehicle and coupled to said first cable;

a second cable electronic actuator means mounted outside the vehicle and coupled to said second cable;

a clutch mechanical actuation means mounted in the vehicle and coupled to the clutch pedal, and including a third flexible cable for causing movement of the clutch; and a third cable electronic actuator means mounted outside the vehicle and coupled to said third cable.

2. A transmission gear and clutch shifting apparatus as recited in claim 1 wherein said rotation means include:

a pivot means for turning, having a first radial arm coupled to said first cable and a second radial arm, circumferentially displaced from said first radial arm, coupled to said first slot means, so that a component of motion of the first cable and a component of motion of the first slot are perpendicular to each other.

3. A transmission gear and clutch shifting apparatus as recited in claim 2 wherein: said second radial arm is telescopic in length as said first slot means moves along the longitudinal axis of the vehicle.

4. A transmission gear and clutch shifting apparatus as recited in claim 2 wherein: said coupling between said second radial arm and said first slot means is a sliding coupling.

5. A transmission gear and clutch shifting apparatus as recited in claim 2 wherein: said first and second coupling slot means each include a pair of movable plates to facilitate the alignment of the intersection of the slots for the gear shift lever.

6. A transmission gear and clutch shifting apparatus as recited in claim 1 wherein said gear shift mechanical actuation means includes a mounting bracket adapted to slide on and fasten to a vehicle's seat tracks.

7. A transmission gear and clutch shifting apparatus as recited in claim 1 wherein said clutch mechanical actuation means includes a spring attachment means to said third flexible cable whereby extension of said clutch mechanical actuation means is enhanced by said spring attachment means.

8. A transmission gear and clutch shifting apparatus as recited in claim 1 wherein said first, second and third electronic actuator means each include:

a motor for generating rotational movement;

a lead screw assembly coupled to said motor for converting rotational to linear movement;

a control means coupled to said motor for controlling motor operation;

a tachometer coupled to said motor for providing to said control means a feedback signal indicating motor speed; and a linear displacement transducer coupled to said lead screw assembly for providing to said control means a feedback signal indicating linear position.

9. A transmission gear and clutch shifting apparatus as recited in claim 8 further comprising a remote control box means coupled to said control means for establishing reference points for the position of said first, second and third flexible cables after installation of said transmission gear and clutch shifting apparatus in a vehicle.

10. A transmission gear and clutch shifting apparatus as recited in claim 1 further comprising a strain sensor coupled to said third flexible cable for generating a signal indicating the strain at different positions of the clutch thus determining the clutch engagement point.

11. A transmission gear and clutch shifting apparatus for the automatic operation of a manual gear shift mechanism in an automotive vehicle, the automotive vehicle having a gear shift lever with a plurality of manual shift positions, said gear and clutch shifting apparatus including:

a gear shift mechanical actuation means mounted in the vehicle and coupled to the gear shift lever having a first flexible cable for causing actuation of the gear shift lever along the longitudinal axis of the vehicle, and a second flexible cable for causing actuation of the gear shift lever along the transverse axis of the vehicle, said gear shift mechanical actuation means including a first coupling slot means having an elongated slot generally aligned with the transverse axis of the vehicle for passing the gear shift lever and being coupled to said first flexible cable by a rotation means so that motion of said first flexible cable along the transverse axis of the vehicle causes motion of the slot of said first coupling slot means along the longitudinal axis of the vehicle, said gear shift actuator further including a second coupling slot means having an elongated slot generally aligned with the longitudinal axis of the vehicle for passing the gear shift lever and being coupled to said second flexible cable for causing motion of the gear shift along the transverse axis of the vehicle;

a first cable electronic actuator means mounted outside the vehicle and coupled to said first cable;

a second cable electronic actuator means mounted outside the vehicle and coupled to said second cable;

a clutch mechanical actuation means mounted in the vehicle and coupled to the clutch pedal, and including a third flexible cable for causing movement of the clutch;

a third cable electronic actuator means mounted outside the vehicle and coupled to said third cable;

said rotation means including a pivot means for turning, having a first radial arm coupled to said first cable and a second telescopically adjustable radial arm, circumferentially displaced from said first radial arm, coupled to said first slot means, so that a component of motion of the first cable and a component of motion of the first slot are perpendicular to each other;

said first and second coupling slot means each including a pair of movable plates to facilitate the alignment of the intersection of the slots for the gear shift lever;

said gear shift mechanical actuation means including a mounting bracket adapted to couple to a vehicle's seat tracks;

said first, second and third electronic actuator means each including a motor for generating rotational movement, a lead screw assembly coupled to said motor for converting rotational to linear movement, a control means coupled to said motor for controlling motor operation, a tachometer coupled to said motor for providing to said control means a feedback signal indicating motor speed, and a linear displacement transducer coupled to said lead screw assembly for providing to said control means a feedback signal indicating linear position;

a strain gauge coupled to said third flexible cable for generating a signal indicating the strain at different positions of the clutch thus determining the clutch engagement point; and a remote control box means coupled to said control means for establishing reference points for the position of said first, second and third flexible cables after installation of said transmission gear and clutch shifting apparatus in a vehicle.

* * * * *